United States Patent
Cardwell et al.

(10) Patent No.: US 11,009,381 B1
(45) Date of Patent: May 18, 2021

(54) HANDS FREE MEASURING SPOON ASSEMBLY

(71) Applicants: Cynthia Cardwell, Greentown, IN (US); Robert Cardwell, Greentown, IN (US)

(72) Inventors: Cynthia Cardwell, Greentown, IN (US); Robert Cardwell, Greentown, IN (US)

( * ) Notice: Subject to any disclaimer, the term of this patent is extended or adjusted under 35 U.S.C. 154(b) by 0 days.

(21) Appl. No.: 16/667,103

(22) Filed: Oct. 29, 2019

(51) Int. Cl.
*G01F 19/00* (2006.01)

(52) U.S. Cl.
CPC .................. *G01F 19/002* (2013.01)

(58) Field of Classification Search
CPC ...................................... G01F 19/002
See application file for complete search history.

(56) References Cited

U.S. PATENT DOCUMENTS

| | | | | |
|---|---|---|---|---|
| 1,694,119 A | * | 12/1928 | Frank | A47G 19/24 141/381 |
| 3,400,591 A | * | 9/1968 | Larson | G01F 19/002 73/426 |
| 4,043,203 A | * | 8/1977 | Montesi | G01F 19/002 73/427 |
| D332,579 S | | 1/1993 | Goldman | |
| 5,706,974 A | * | 1/1998 | Murdick | B65D 51/246 206/230 |
| 7,175,041 B2 | * | 2/2007 | Ekkert | B65D 51/246 206/541 |
| 7,607,348 B2 | | 10/2009 | Law | |
| 7,673,769 B2 | | 3/2010 | McRorie | |
| 8,215,167 B2 | * | 7/2012 | Hall | G01F 19/002 73/426 |
| 8,650,951 B2 | * | 2/2014 | Kern | G01F 19/002 73/426 |
| 8,678,198 B1 | * | 3/2014 | D'Andrea | B07B 1/02 209/417 |
| 9,476,749 B1 | * | 10/2016 | Wiggins | B65D 21/0233 |
| 9,541,441 B2 | * | 1/2017 | Prero | B65D 77/245 |
| 2002/0060220 A1 | * | 5/2002 | Torniainen | B65D 51/246 220/212 |
| 2003/0029868 A1 | * | 2/2003 | Davidov | B65D 51/246 220/212 |
| 2019/0256261 A1 | * | 8/2019 | van Drecht | B65B 31/028 |
| 2019/0270558 A1 | * | 9/2019 | Pietraniec | B65D 77/245 |

FOREIGN PATENT DOCUMENTS

WO    WO2008138230    11/2008

\* cited by examiner

*Primary Examiner* — Jamel E Williams

(57) ABSTRACT

A hands free measuring spoon assembly for reducing spillage and waste includes a handle that is coupled to and extends from a circumference of a bowl so that the handle is substantially coplanar with a top of the bowl. The handle is configured to be grasped in a hand of a user to lift the bowl. A first fastener is coupled to the circumference of the bowl so that the first fastener is opposingly positioned on the bowl relative to the handle. A second fastener is coupled to the handle distal from the bowl. The second fastener and the first fastener are configured to be selectively coupled to a lip of a vessel so that the bowl is supported over an opening of the vessel. The user then is positioned to portion a component into the bowl in preparation for adding a portion of the component to the vessel.

13 Claims, 5 Drawing Sheets

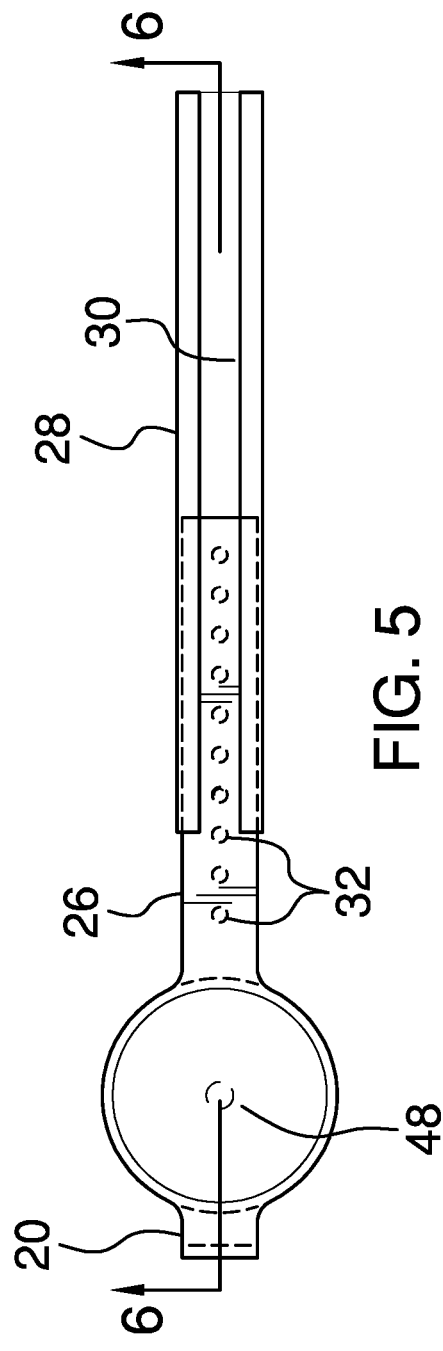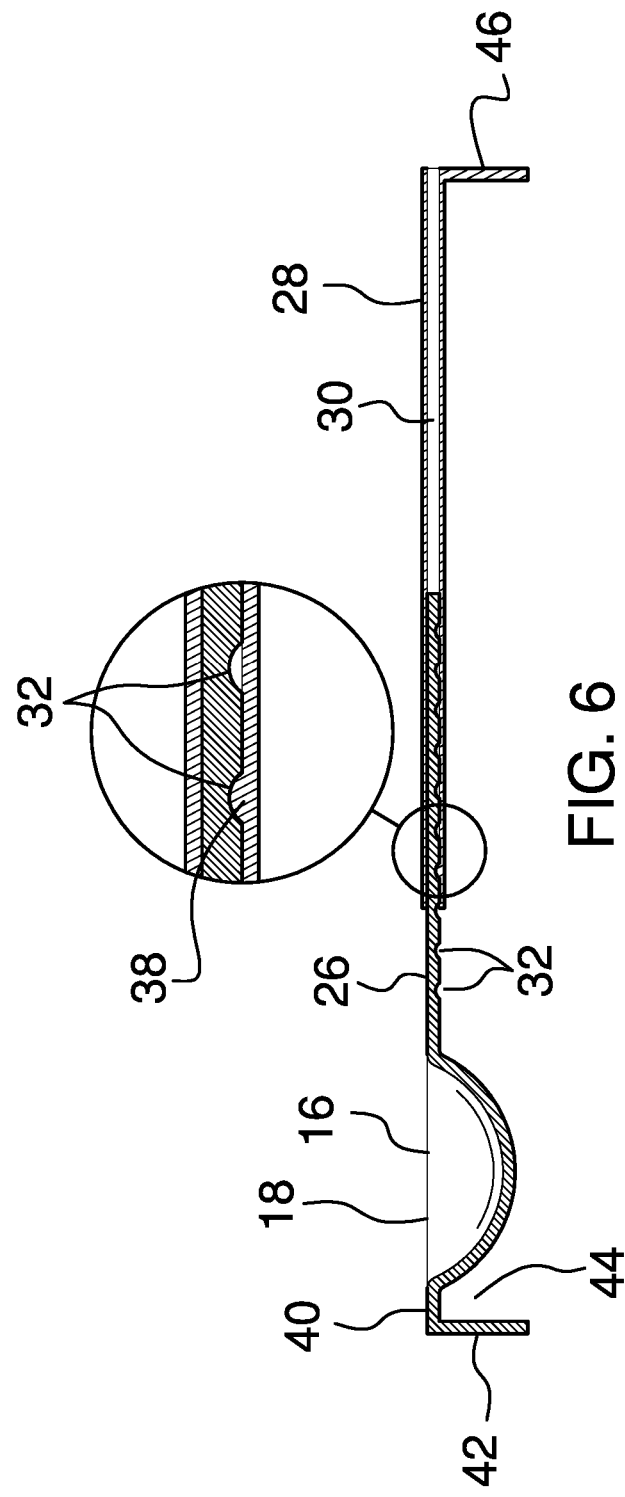

HANDS FREE MEASURING SPOON ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to measurement devices and more particularly pertains to a new measurement device for reducing spillage and waste.

(2) Description of Related Art Including Information Disclosed Under 37 CFR 1.97 and 1.98

The prior art relates to measurement devices.

BRIEF SUMMARY OF THE INVENTION

An embodiment of the disclosure meets the needs presented above by generally comprising a handle that is coupled to and extends from a circumference of a bowl so that the handle is substantially coplanar with a top of the bowl. The handle is configured to be grasped in a hand of a user to lift the bowl. A first fastener is coupled to the circumference of the bowl so that the first fastener is opposingly positioned on the bowl relative to the handle. A second fastener is coupled to the handle distal from the bowl. The second fastener and the first fastener are configured to be selectively coupled to a lip of a vessel so that the bowl is supported over an opening of the vessel. The user then is positioned to portion a component, such as an ingredient of a recipe, into the bowl in preparation for adding a portion of the component to the vessel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a top view of an embodiment of the disclosure.

FIG. 6 is a cross-sectional view of an embodiment of the disclosure.

DETAILED DESCRIPTION OF THE INVENTION

Figure 1:
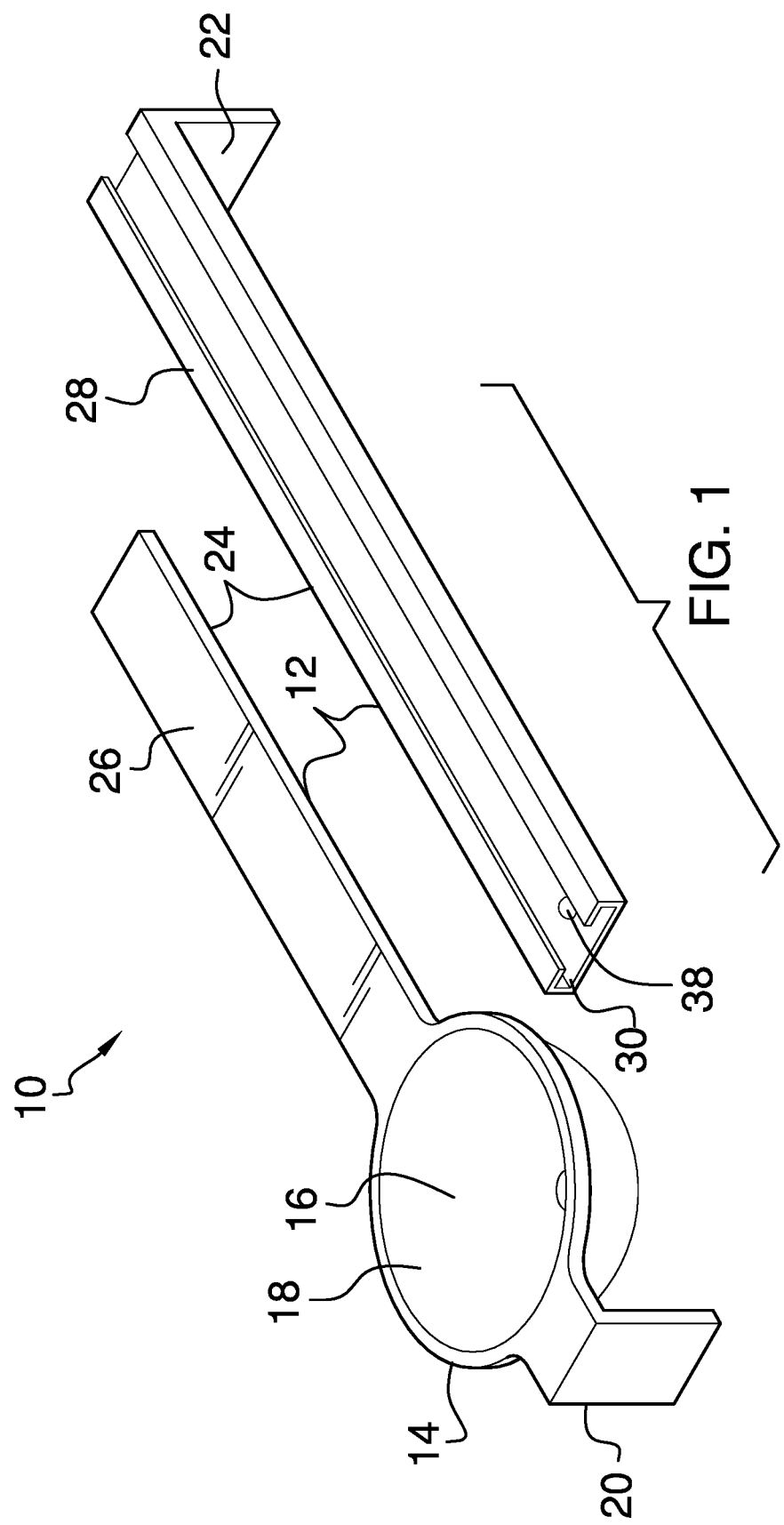
FIG. 1 is an isometric perspective view of a hands free measuring spoon assembly according to an embodiment of the disclosure.

With reference now to the drawings, and in particular to FIGS. 1 through 7 thereof, a new measurement devices embodying the principles and concepts of an embodiment of the disclosure and generally designated by the reference numeral 10 will be described.

Figure 7:
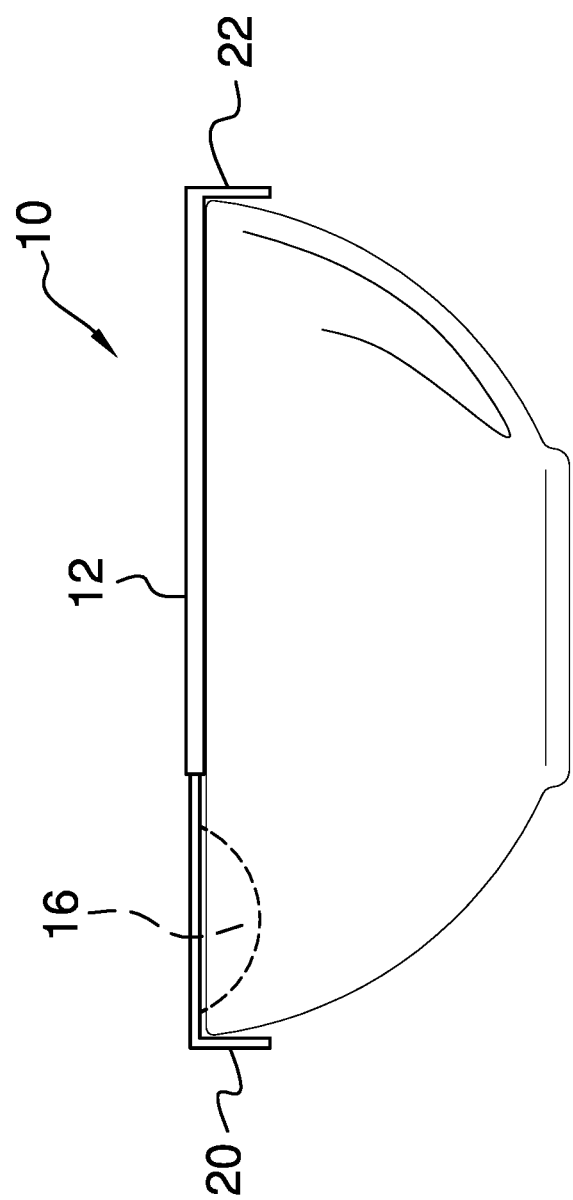
FIG. 7 is an in-use view of an embodiment of the disclosure.

As best illustrated in FIGS. 1 through 7, the hands free measuring spoon assembly 10 generally comprises a handle 12 that is coupled to and extends from a circumference 14 of a bowl 16 so that the handle 12 is substantially coplanar with a top 18 of the bowl 16. The handle 12 is configured to be grasped in a hand of a user to lift the bowl 16. A first fastener 20 is coupled to the circumference 14 of the bowl 16 so that the first fastener 20 is opposingly positioned on the bowl 16 relative to the handle 12. A second fastener 22 is coupled to the handle 12 distal from the bowl 16. The second fastener 22 and the first fastener 20 are configured to be selectively coupled to a lip of a vessel so that the bowl 16 is supported over an opening of the vessel, as shown in FIG. 7. The user then is positioned to portion a component, such as an ingredient of a recipe, into the bowl 16 in preparation for adding a portion of the component to the vessel.

The bowl 16 comprises a set of bowls 16. Each bowl 16 has a respective volume so that the set of bowls 16 comprises bowls 16 that have a variety of volumes. The set of bowls 16 may comprise six bowls 16 that have volumes of 15.0 milliliters, 7.5 milliliters, 5.0 milliliters, 2.5 milliliters, 1.25 milliliters, and 0.63 milliliters, respectively. Other sets of bowls 16 having different numbers of bowls, each having a respective volume, are anticipated by the present invention.

Figure 2:
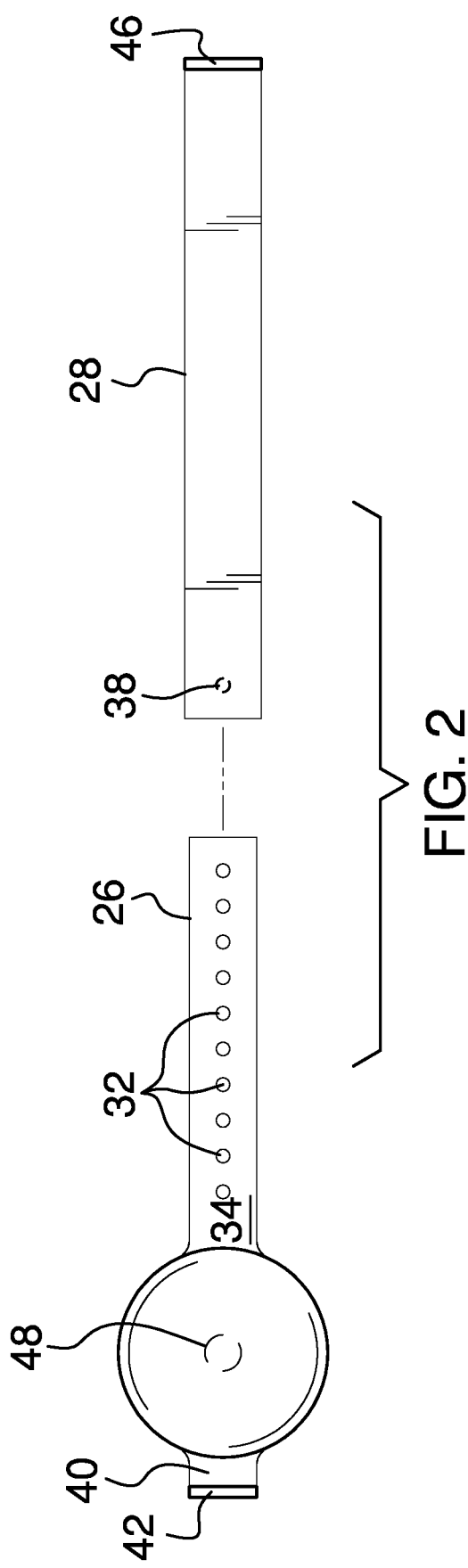
FIG. 2 is a bottom view of an embodiment of the disclosure.

The handle 12 comprises a plurality of nested sections 24 so that the handle 12 is selectively extensible. The plurality of nested sections 24 may comprise a first section 26 that is coupled to the bowl 16 and a second section 28 that selectively couplable to and extensible from the first section 26, as shown in FIG. 2. The present invention also anticipates the plurality of nested sections 24 comprising more than two nested sections 24.

The first section 26 and the bowl 16 have an overall length of from 8.0 to 33.0 centimeters. The second section 28 has a length that is substantially equivalent to the overall length of the first section 26 and the bowl 16. The first section 26 and the bowl 16 may have an overall length of 14.0 centimeters.

Figure 3:
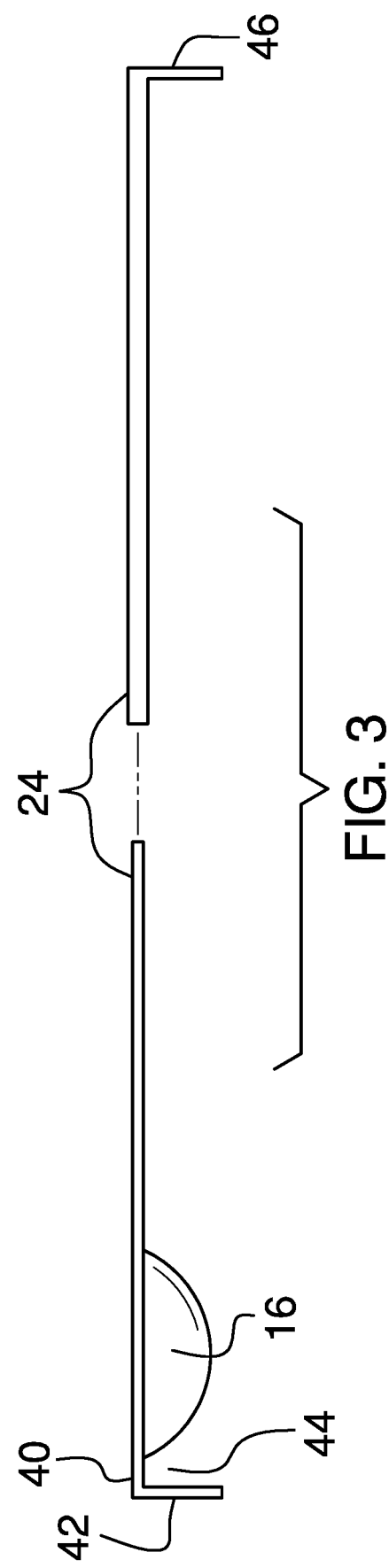
FIG. 3 is a side view of an embodiment of the disclosure.

The second section 28 of the handle 12 is C-track type and thus defines a channel 30, as shown in FIG. 1. The channel 30 is cross-sectionally complementary to the first section 26 so that the channel 30 is positioned to selectively insert the first section 26 to removably and slidably couple the second section 28 to the first section 26, as shown in FIG. 3.

Each of a plurality of recesses 32 that is positioned in a lower face 34 of the first section 26 of the handle 12 is positioned equally distant from opposing edges 36 of the first section 26, as shown in FIG. 2. A protrusion 38 is coupled to the second section 28 and extends into the channel 30. The protrusion 38 is positioned to selectively insert into a respective recess 32 to fixedly position the second section 28 relative to the first section 26 so that the handle 12 is selectively length adjustable.

The first fastener 20 comprises a first plate 40 and a second plate 42, which are substantially rectangularly shaped. The first plate 40 is coupled to and extends from the circumference 14 of the bowl 16 so that the first plate 40 is substantially coplanar with the top 18 of the bowl 16. The second plate 42 is coupled to and extends perpendicularly from the first plate 40 so that the second plate 42, the first plate 40, and the bowl 16 define a gap 44, which is configured to insert the lip of the vessel. The gap 44 between the top 18 of the bowl 16 and the first plate 40 measures from 3.80 to 8.90 millimeters. The gap 44 between the top 18 of the bowl 16 and the first plate 40 may measure 6.35 millimeters.

The second fastener 22 comprises a tab 46 that is coupled to and extends from the handle 12. The tab 46 is configured to be positioned over the lip of the vessel so that the handle 12 and the bowl 16 are coupled to the vessel and extend across the opening of the vessel. The user then is positioned to portion the component into the bowl 16 without having to use a hand to grasp the handle 12 to support the bowl 16.

The present invention anticipates the first fastener 20 and the second fastener 22 comprising other fastening means, such as, but not limited to, suction cups, clips, and the like.

Figure 4:
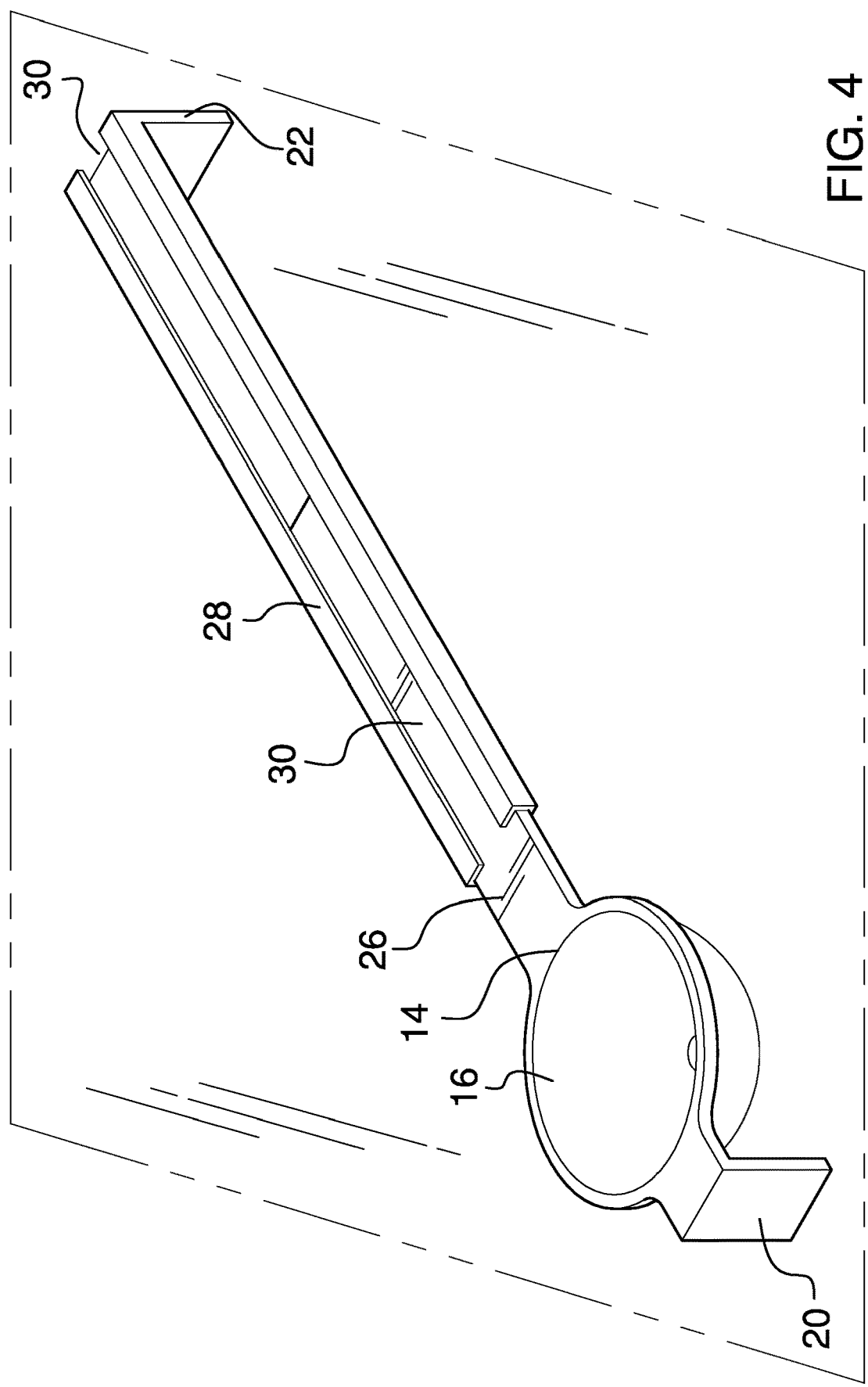
FIG. 4 is an isometric perspective view of an embodiment of the disclosure.

The second plate 42 extends past a bottom 48 of the bowl 16 by from 1.00 to 2.00 millimeters, as shown in FIG. 6. The second plate 42 extends past the bottom 48 of the bowl 16 by 1.59 millimeters. The tab 46 is dimensioned equivalently to the second plate 42 so that the tab 46 and the second plate 42 are configured to support the bowl 16 and the handle 12 on a substantially horizontal surface, as shown in FIG. 4. With the bowl 16 thus positioned, the user can portion the component into the bowl 16 without having to use a hand to grasp the handle 12 to support the bowl 16. The user then can grasp the handle 12 to pour the portion of the component into the vessel. The assembly 10 thus is useful in portioning out medications that are in liquid or powder form.

In use, the second section 28 of the handle 12 is adjusted relative to the first section 26 so that the handle 12 and the bowl 16 are sized to extend across the opening of the vessel. The lip of the vessel is inserted into the gap 44 and the tab 46 is positioned over the lip so that the handle 12 and the bowl 16 are coupled to the vessel. The user then is positioned to portion the component into the bowl 16 without having to use a hand to grasp the handle 12 to support the bowl 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

We claim:

1. A hands free measuring spoon assembly comprising:
    a bowl;
    a handle coupled to and extending from a circumference of the bowl such that the handle is substantially coplanar with a top of the bowl wherein the handle is configured for grasping in a hand of a user for lifting the bowl, the handle comprising a plurality of nested sections such that the handle is selectively extensible;
    a first fastener coupled to the circumference of the bowl such that the first fastener is opposingly positioned on the bowl relative to the handle; and
    a second fastener coupled to the handle distal from the bowl wherein the second fastener and the first fastener are configured for selectively coupling to a lip of a vessel such that the bowl is supported over an opening of the vessel positioning the user for portioning a component into the bowl in preparation for adding a portion of the component to the vessel.

2. The assembly of claim 1, further including the bowl comprising a set of bowls, each bowl having a respective volume such that the set of bowls comprises bowls having a variety of volumes.

3. The assembly of claim 2, further including the set of bowls comprising six bowls having volumes of 15.0 milliliters, 7.5 milliliters, 5.0 milliliters, 2.5 milliliters, 1.25 milliliters, and 0.63 milliliters, respectively.

4. The assembly of claim 1, further including the plurality of nested sections comprising a first section coupled to the bowl and a second section selectively couplable to and extensible from the first section.

5. The assembly of claim 4, further including the first section and the bowl having an overall length of from 8.0 to 33.0 centimeters, the second section having a length substantially equivalent to the overall length of the first section and the bowl.

6. The assembly of claim 5, further including the first section and the bowl having an overall length of 14.0 centimeters.

7. The assembly of claim 4, further including the second section being C-track type defining a channel, the channel being cross-sectionally complementary to the first section such that the channel is positioned for selectively inserting the first section for removably slidably coupling the second section to the first section.

8. The assembly of claim 7, further comprising:
a plurality of recesses positioned in a lower face of the first section of the handle, each recess being positioned equally distant from opposing edges of the first section; and
a protrusion coupled to the second section and extending into the channel such that the protrusion is positioned for selectively inserting into respective recess for fixedly positioning the second section relative to the first section such that the handle is selectively length adjustable.

9. The assembly of claim 1, further comprising:
the first fastener comprising a first plate and a second plate, the first plate being coupled to and extending from the circumference of the bowl such that the first plate is substantially coplanar with the top of the bowl, the second plate being coupled to and extending perpendicularly from the first plate such that the second plate, the first plate, and the bowl define a gap wherein the gap is configured for inserting the lip of the vessel; and
the second fastener comprising a tab coupled to and extending from the handle wherein the tab is configured for positioning over the lip of the vessel such that the handle and the bowl are coupled to the vessel and extend across the opening of the vessel positioning the user for portioning the component into the bowl in preparation for adding the portion of the component to the vessel.

10. The assembly of claim 9, further including the gap between the top of the bowl and the first plate measuring from 3.80 to 8.90 millimeters.

11. The assembly of claim 10, further including the gap between the top of the bowl and the first plate measuring 6.35 millimeters.

12. The assembly of claim 9, further comprising:
the first plate and the second plate being substantially rectangularly shaped;
the second plate extending past a bottom of the bowl by from 1.00 to 2.00 millimeters; and
the tab being dimensioned equivalently to the second plate wherein the tab and the second plate are configured for supporting the bowl and the handle on a substantially horizontal surface.

13. A hands free measuring spoon assembly comprising:
a bowl, the bowl comprising a set of bowls, each bowl having a respective volume such that the set of bowls comprises bowls having a variety of volumes, the set of bowls comprising six bowls having volumes of 15.0 milliliters, 7.5 milliliters, 5.0 milliliters, 2.5 milliliters, 1.25 milliliters, and 0.63 milliliters, respectively;
a handle coupled to and extending from a circumference of the bowl such that the handle is substantially coplanar with a top of the bowl wherein the handle is configured for grasping in a hand of a user for lifting the bowl, the handle comprising a plurality of nested sections such that the handle is selectively extensible, the plurality of nested sections comprising a first section coupled to the bowl and a second section selectively couplable to and extensible from the first section, the first section and the bowl having an overall length of from 8.0 to 33.0 centimeters, the second section having a length substantially equivalent to the overall length of the first section and the bowl, the first section and the bowl having an overall length of 14.0 centimeters, the second section being C-track type defining a channel, the channel being cross-sectionally complementary to the first section such that the channel is positioned for selectively inserting the first section for removably slidably coupling the second section to the first section;
a plurality of recesses positioned in a lower face of the first section of the handle, each recess being positioned equally distant from opposing edges of the first section; and
a protrusion coupled to the second section and extending into the channel such that the protrusion is positioned for selectively inserting into respective recess for fixedly positioning the second section relative to the first section such that the handle is selectively length adjustable;
a first fastener coupled to the circumference of the bowl such that the first fastener is opposingly positioned on the bowl relative to the handle, the first fastener comprising a first plate and a second plate, the first plate being coupled to and extending from the circumference of the bowl such that the first plate is substantially coplanar with the top of the bowl, the second plate being coupled to and extending perpendicularly from the first plate such that the second plate, the first plate, and the bowl define a gap wherein the gap is configured for inserting a lip of a vessel, the second plate extending past a bottom of the bowl by from 1.00 to 2.00 millimeters, the second plate extending past the bottom of the bowl by 1.59 millimeters, the gap between the top of the bowl and the first plate measuring from 3.80 to 8.90 millimeters, the gap between the top of the bowl and the first plate measuring 6.35 millimeters, the first plate and the second plate being substantially rectangularly shaped; and
a second fastener coupled to the handle distal from the bowl wherein the second fastener and the first fastener are configured for selectively coupling to the lip of the vessel such that the bowl is supported over an opening of the vessel positioning the user for portioning a component into the bowl in preparation for adding a portion of the component to the vessel, the second fastener comprising a tab coupled to and extending from the handle wherein the tab is configured for positioning over the lip of the vessel such that the handle and the bowl are coupled to the vessel and extend across the opening of the vessel positioning the user for portioning the component into the bowl in preparation for adding the portion of the component to the vessel, the tab being dimensioned equivalently to the second plate wherein the tab and the second plate are configured for supporting the bowl and the handle on a substantially horizontal surface.

* * * * *